Nov. 7, 1950  O. SAMPSON  2,529,422
SWATH LIFTER FOR WINDROWED GRAIN
Filed March 11, 1948  2 Sheets-Sheet 1
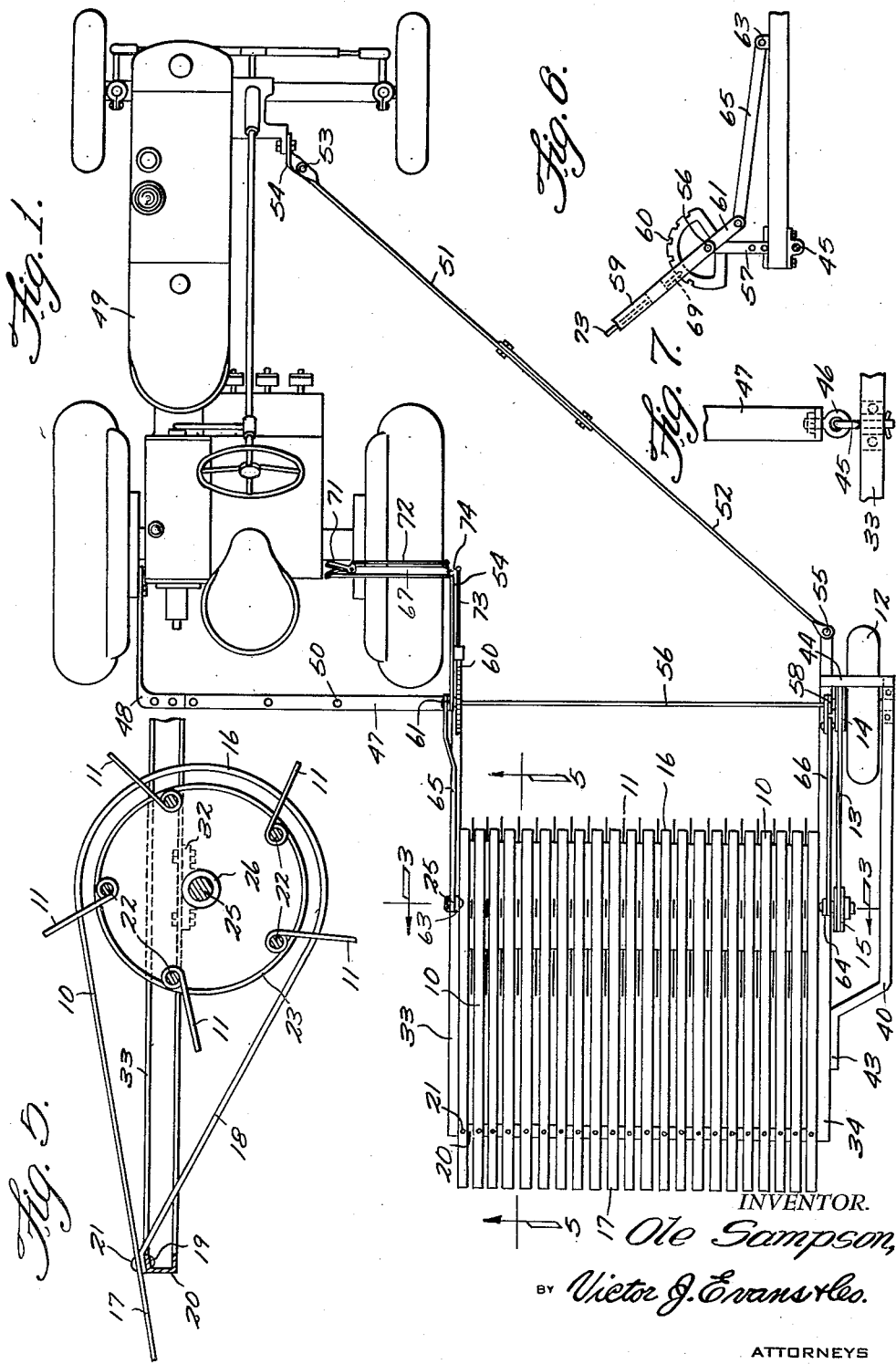
INVENTOR.
Ole Sampson,
BY Victor J. Evans & Co.
ATTORNEYS Nov. 7, 1950   O. SAMPSON   2,529,422
SWATH LIFTER FOR WINDROWED GRAIN
Filed March 11, 1948   2 Sheets-Sheet 2
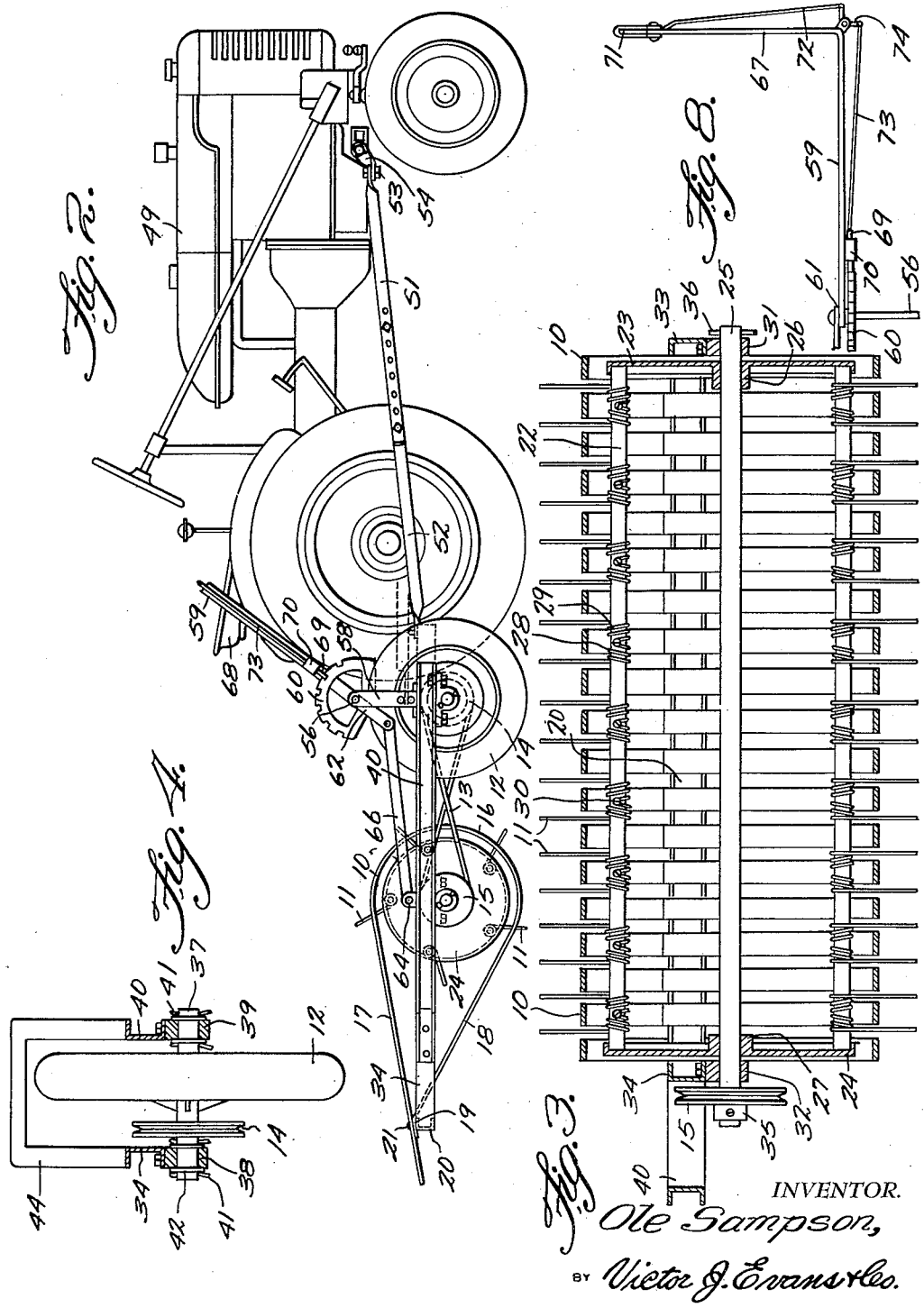
INVENTOR.
Ole Sampson,
BY Victor J. Evans & Co.
ATTORNEYS Patented Nov. 7, 1950

2,529,422

UNITED STATES PATENT OFFICE 2,529,422

SWATH LIFTER FOR WINDROWED GRAIN

Ole Sampson, Osceola, Mo.

Application March 11, 1948, Serial No. 14,343

1 Claim. (Cl. 56—372)

This invention relates to farm implements of the type adapted to be attached to a tractor, and in particular an elongated drum-shaped element formed with spaced slats and having rotatably mounted tines positioned to travel between the slats, and means attaching the device to a tractor in an offset position wherein the drum-shaped element is extended at one side of the tractor.

The purpose of this invention is to provide a device for elevating grain and particularly wet grain that has been beaten by the elements or that may have settled down in the stubble from the swath and depositing the grain back in the swath in the same position in which it was before, that is with the heads leading so that it may readily be picked up by a combine.

Various implements have been provided for turning and elevating grain, hay, and the like, that has been beaten down by rain and the like, but in turning the hay or straw the position thereof is reversed and often it is twisted in all directions so that it is difficult for the combine to pick it up efficiently and much grain is lost. Some of these devices drop the grain head first which not only shatters or separates the grain from the straw but also makes it very difficult to recover. With these thoughts in mind this invention contemplates an attachment for tractors which includes a plurality of fingers or tines which pick or rake up grain and deposit it upon a sloping surface from which it slides back on the stubble in substantially the same position in the swath in which it was deposited by the mower.

The object of this invention is, therefore, to provide an attachment for tractors and the like which elevates grain from the stubble without the tractor or other propelling means therefor traveling over the grain.

Another object of the invention is to provide a grain or hay recovering device that may readily be attached to the average farm tractor.

Another object of the invention is to provide a device for elevating grain, hay, and the like from a swarth in which the elevation thereof may readily be adjusted.

A further object of the invention is to provide a farm implement for recovering grain, hay, and the like beaten down into the stubble by the elements which is of a simple and economical construction.

With these and other objects and advantages in view the invention consists of the new and novel combination, construction, and arrangement of parts as hereinafter more fully described, set forth in the claim appended hereto, and disclosed in the accompanying drawings forming part hereof, wherein:

Figure 1 is a plan view illustrating the implement attached to a tractor.

Figure 2 is a view showing a side elevation of a tractor with the implement installed thereon.

Figure 3 is a view taken on line 3—3 of Figure 1 showing a longitudinal section through the elongated drum shaped element with the tractor and other parts omitted.

Figure 4 is a detail showing the traction wheel for rotating the pick-up elements with the mounting elements thereof shown in section.

Figure 5 is a view showing a cross section through the device taken on line 5—5 of Figure 1, with parts broken away.

Figure 6 is a detail illustrating the ratchet for adjusting the elevation of the device.

Figure 7 is a detail showing the flexible connection between the device and the draw-bar of the tractor.

Figure 8 is a detail showing a plan view of the ratchet supporting elements on an enlarged scale.

Referring now to the drawings wherein like reference characters denote corresponding parts the device for elevating grain and hay in a swath of this invention includes a plurality of spaced slats 10 with tines 11 traveling between the slats and adapted to pick up the grain or hay and deposit it upon the slats, and a traction wheel 12 for actuating the tines through a crossed belt 13 trained over pulleys 14 and 15.

The slats 10 are formed as illustrated in Figure 5 with arcuate forward ends 16 and with the ends 17 and 18 thereof extending backward in converging relation with the lower ends 18 positioned on a flange 19 of a cross channel or bar 20 and with the upper ends 17 positioned on the ends 18 and extending beyond the ends thereof. The ends 17 and 18 are secured to the flange 19 by rivets 21 which hold the slats in the position shown.

The tines 11, which are positioned to travel between the slats as illustrated in Figures 1 and 3, are mounted on rods 22 between flanges 23 and 24 and the flanges are mounted on a shaft 25 through hubs 26 and 27. In the design shown the tines are formed with coils 28 and 29 which provide resiliency therein to prevent bending and breaking, and the coils are positioned under one slat with the tines extending through the spaces at each side of the slat, and the coils are secured in position upon the rods 22 by pins 30.

The shaft 25 is rotatably mounted in bearings 31 and 32 on the lower sides of channels providing inner and outer side beams 33 and 34 respectively which form the sides of the frame of the implement, and the pulley 15 is secured on the end of the shaft by a set collar 35. The opposite end of the shaft may be held by a cotter pin 36, or by any suitable means.

The traction wheel 12 is mounted on a stub shaft 37, as shown in Figure 4, and the shaft is rotatably mounted in bearings 38 and 39, the bearing 38 being mounted on the under surface of the channel 34, and the bearing 39 on the under surface of the channel 40 which is spaced from the channel 34, as shown in Figure 1. The pulley 14 is mounted on the shaft 37 and the shaft is retained in position by cotter pins 41 and washers 42. One end of the channel 40 is secured to the channel 34 at the point 43 and the other end is suspended from the channel 34 by a yoke 44, as shown in Figure 4.

The cross channel 20 is mounted between the ends of the side channels 33 and 34, and the forward end of the channel 33 is provided with an eye-bolt 45 by which it is suspended from an eye-bolt 46 in a draw-bar brace 47 which extends from a draw-bar 48 extending from the rear of a tractor, as indicated by the numeral 49. The draw-bar brace is adjustably held on the draw-bar by bolts 50, and the forward end of the outer channel 34 is adjustably held to the tractor by a diagonally disposed brace formed with bars 51 and 52, as shown in Figure 1. The forward end of the bar 51 is held to the tractor by a bolt 53 in a clip 54, and the rear end of the bar 52 is held to the forward end of the channel 34 by a bolt 55.

The forward end of the device is provided with a transverse shaft 56 which is mounted in bearing stands 57 and 58 on the channels 33 and 34, respectively, and at one end of the shaft is a crank 59 that coacts with a ratchet 60 on the bearing stand 57, as shown in Figures 2 and 6. Arms 61 and 62 are fixedly mounted on the shaft 56 and the outer ends of the arms are connected to clips 63 and 64 on the channels 33 and 34, respectively, by links 65 and 66, and as the shaft is turned by the crank 59 the frame of the device may be raised or lowered as desired. The upper end of the crank is provided with an extension 67 that extends over to a point adjacent the driver's seat 68, and a pawl 69 which is slidably mounted in a bearing 70 on the crank is controlled by a handle 71, at the end of the extension 67, through rods 72 and 73 and a bell-crank 74. By this means the pawl 69 is moved from one notch in the ratchet 60 to another to adjust the elevation of the tines and slats.

With the parts arranged in this manner the device may be readily be attached to a tractor, as shown and described, and as it is drawn along a windrow or swath of grain the tines will loosen and pick up the packed straw or hay and deposit it upon the slats from which it will slide back to the ground or stubble. Handling the grain in this manner will not only facilitate drying, but the grain will be deposited so that it may readily be picked up by the combine or the like.

It will also be noted that the device is positioned in an extended position at one side of the tractor so that the tractor does not ride over the grain It will be understood that modifications may be made in the design and arrangement of the parts without departing from the spirit of the invention.

What is claimed is:

In a swath turner attachment the combination which comprises a pair of spaced longitudinally extended inner and outer side beams connected at the rear by a cross bar, a transversely disposed draw bar brace extended outwardly from the forward end of the inner side beam, a draw bar extended forwardly from the outer end of said draw bar brace, means attaching the forward end of the said draw bar to a tractor, a diagonally disposed brace extended forwardly and inwardly from the forward end of the said outer side beam, means attaching the forward end of the said diagonally disposed brace to a tractor, a traction wheel journaled on the forward end of said outer side beam, a ratchet carried by the forward end of the said inner side beam, a hand lever having a pawl thereon mounted on the forward end of the inner side beam and positioned to coact with the ratchet to adjust the elevation of the said side beam, a transversely disposed shaft journaled on the said side beam and positioned intermediate of the ends thereof, pulleys mounted on the said traction wheel and transversely disposed shafts, respectively, a plurality of spaced semi-circular slats the upper ends of which extend rearwardly and slope downwardly to rest upon the upper edge of the said transversely disposed cross bar connecting the rear ends of the said side beams, the lower ends of said slats extended rearwardly and sloping upwardly to the upper edge of said cross bar, drum heads carried by the said transversely disposed shaft and positioned in the ends of the said open slats, spaced longitudinally disposed rods positioned in said slats and carried by the said drum heads, tines resiliently mounted on said rods and positioned to extend through the spaces between the said slats, and a crossed belt trained over the pulleys on the said traction wheel and transverse shafts respectively whereby the tines are rotated in a counterclockwise direction for picking up hay and grain and feeding it rearwardly over the upper ends of said slats.

OLE SAMPSON.

REFERENCES CITED

The following references are of record in the file of this patent:

UNITED STATES PATENTS

| Number | Name | Date |
|---|---|---|
| 757,372 | Warner | Apr. 12, 1904 |
| 842,208 | Kirkman | Jan. 29, 1907 |
| 2,172,655 | Gallagher et al. | Sept. 12, 1939 |
| 2,256,829 | Hyman | Sept. 23, 1941 |
| 2,430,734 | Raney et al | Nov. 11, 1947 |